United States Patent
Tokarz et al.

(10) Patent No.: US 12,214,673 B2
(45) Date of Patent: *Feb. 4, 2025

(54) ELECTRICAL CIRCUIT BASED VOLTAGE CONTROL OF ELECTRIC VEHICLE BATTERIES

(71) Applicant: Rivian IP Holdings, LLC, Irvine, CA (US)

(72) Inventors: Nick P. Tokarz, San Jose, CA (US); Thomas Rocroi, Richmond, CA (US); Brian N. Harries, Redondo Beach, CA (US); Ryan David, Silverado, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,132

(22) Filed: Oct. 17, 2023

(65) Prior Publication Data

US 2024/0059152 A1    Feb. 22, 2024

Related U.S. Application Data

(63) Continuation of application No. 17/810,876, filed on Jul. 6, 2022, now Pat. No. 11,794,585.

(51) Int. Cl.
*B60L 3/00* (2019.01)
*B60L 3/04* (2006.01)
(Continued)

(52) U.S. Cl.
CPC ............... *B60L 3/0046* (2013.01); *B60L 3/04* (2013.01); *B60L 58/10* (2019.02); *H01H 39/006* (2013.01); *H01H 2039/008* (2013.01)

(58) Field of Classification Search
CPC ........ B60L 3/0046; B60L 3/04; B60L 3/0007; B60L 3/00; B60L 58/10; B60L 1/00; H01H 39/006; H01H 2039/008
See application file for complete search history.

(56) References Cited

U.S. PATENT DOCUMENTS 7,116,078 B2 * 10/2006 Colombo ............... H02J 7/0032
320/104
9,221,343 B2 12/2015 Tokarz et al.
(Continued)

OTHER PUBLICATIONS

Cope, C., Battery Disconnect Devices Related to Vehicle Safety, Proceedings of the 2008 ASME International Mechanical Engineering Congress and Exposition, Oct. 31-Nov. 6, 2008, pp. 1-10. (Year: 2008).

(Continued)

*Primary Examiner* — Russell Frejd
(74) *Attorney, Agent, or Firm* — Foley & Lardner LLP

(57) ABSTRACT

Voltage control of electric vehicle batteries is provided. A system can include an electrical circuit of an electric vehicle that can include a plurality of power supplies and a driver component that can be configured to be energized by the plurality of power supplies and provide a voltage greater than a threshold from a battery of the electric vehicle to a motor of the electric vehicle. The electrical circuit can include a switch module that connects the driver component with the plurality of power supplies. The switch module can detect that the electric vehicle generated a signal to actuate an element of the electric vehicle and disconnect, in response to the detection, the driver component from the plurality of power supplies to reduce the voltage provided to the motor below the threshold.

20 Claims, 9 Drawing Sheets

(51) Int. Cl.
  *B60L 58/10*      (2019.01)
  *H01H 39/00*      (2006.01)

(56)            References Cited

U.S. PATENT DOCUMENTS

2004/0256169 A1   12/2004   Budzilovich et al.
2013/0017421 A1    1/2013   Onnerud et al.
2018/0186241 A1    7/2018   Harvey et al.
2018/0281602 A1   10/2018   Strasser
2019/0288345 A1    9/2019   Hinterberger et al.
2020/0062123 A1    2/2020   Harvey et al.
2022/0278520 A1    9/2022   Boury et al.

OTHER PUBLICATIONS

Final Office Action on U.S. Appl. No. 17/810,876 dated Apr. 19, 2023.
Haifeng et al., Studies of a High Voltage Management System in Electric Vehicles, Applied Mechanics and Materials, vols. 80-81, pp. 825-831. (Year: 2011).
Kassakian et al, Automotive Electrical Systems circa 2005, IEEE Spectrum, Aug. 1996, pp. 22-27. (Year: 1996).
Non-Final Office Action on U.S. Appl. No. 17/810,876 dated Jan. 31, 2023.
Notice of Allowance on U.S. Appl. No. 17/810,876 dated Jun. 26, 2023.

\* cited by examiner

ELECTRICAL CIRCUIT BASED VOLTAGE CONTROL OF ELECTRIC VEHICLE BATTERIES

CROSS-REFERENCE TO RELATED APPLICATION

This application claims the benefit of priority under 35 U.S.C. § 120 as a continuation of U.S. Non-Provisional patent application Ser. No. 17/810,876, filed on Jul. 6, 2022 and issued as U.S. Pat. No. 11,794,585 on Oct. 24, 2023, which is hereby incorporated by reference herein in its entirety for all purposes.

INTRODUCTION

Vehicles, such as electric vehicles, can include an electric components that are powered by batteries. These batteries can have varying levels of power.

SUMMARY

The present disclosure provides systems and methods to improve the speed with which the voltage or power from the high voltage electric vehicle ("EV") battery to vehicle components, such as a motor of the EV drivetrain, is either disconnected or reduced to a level that is below a threshold in response to an element of the EV being actuated. For example, in the event in which an element of an EV, such as an airbag, is actuated, it can be beneficial to quickly disconnect or reduce the voltage from the EV high voltage battery powering one or more parts of the EV. For example, the present solution can utilize a hardware-based architecture in the form of an electrical circuit that can disconnect or reduce the voltage or power from the EV battery provided to, for example a motor of the EV, in response to a signal that an airbag of the EV has been actuated.

At least one aspect is directed to a system. The system can include an electrical circuit of an electric vehicle. The electric circuit can include a plurality of power supplies. The electric circuit can include a driver component. The driver component can be configured to be energized by the plurality of power supplies. The driver component can provide a voltage greater than a threshold from a battery of the electric vehicle to a motor of the electric vehicle. The electric circuit can include a switch module that can connect the driver component with the plurality of power supplies. The switch module can be configured to detect that the electric vehicle generated a signal to actuate an element of the electric vehicle. The switch module can be configured to disconnect, in response to the detection, the driver component from the plurality of power supplies to reduce the voltage provided to the electric motor to a level that is below the threshold.

At least one aspect is directed to a method. The method can include energizing, by a plurality of power supplies, a driver component of an electric circuit of an electric vehicle. The method can include providing, by the driver component, a voltage greater than a threshold from a battery of the electric vehicle to a motor of the electric vehicle. The method can include connecting, by a switch module, the driver component to a plurality of power supplies. The method can include detecting, by the switch module, a signal to actuate an element of the electric vehicle. The method can include disconnecting, in response to detecting the signal, the driver component from the plurality of power supplies to reduce the voltage provided to the electric motor below the threshold.

At least one aspect is directed to a method. The method can include providing an electrical circuit of an electric vehicle. The electric circuit can include a plurality of power supplies. The electric circuit can include a driver component. The driver component can be configured to be energized by the plurality of power supplies. The driver component can provide a voltage greater than a threshold from a battery of the electric vehicle to a motor of the electric vehicle. The electric circuit can include a switch module that can connect the driver component with the plurality of power supplies. The switch module can be configured to detect that the electric vehicle generated a signal to actuate an element of the electric vehicle. The switch module can be configured to disconnect, in response to the detection, the driver component from the plurality of power supplies to reduce the voltage provided to the electric motor to a level that is below the threshold.

At least one aspect is directed to an electric vehicle. The electric vehicle can include an electrical circuit of an electric vehicle. The electrical circuit can include a contactor to control power output from a battery of the electric vehicle to a motor of the electric vehicle. The electrical circuit can include a driver component to control the contactor and a set of power supplies to energize the driver component to cause the contactor to provide a voltage greater than a threshold from the battery to the motor. The electrical circuit can include a switch module that, in response to a signal corresponding to deployment of an airbag of the electric vehicle, disconnects the driver component from the set of power supplies to cause the contactor to reduce the voltage from the battery to the motor to less than the threshold.

At least one aspect is directed to an electrical circuit of an electric vehicle. The electrical circuit can include one or more high side driver components connected to one or more contactors and one or more low side driver components connected to the one or more contactors. The electrical circuit can include a set of power supplies to energize the one or more high side driver components and the one or more low side driver components to cause one or more contactors to provide power to a plurality of parts of the electric vehicle. The electrical circuit can include a switch module that, in response to a signal corresponding to deployment of an airbag of the electric vehicle, disconnect the one or more high side driver components from the set of power supplies to cause the one or more contactors to reduce the voltage from the battery to a first subset of the plurality of parts of the electric vehicle, and wherein the electrical circuit maintains connection of the one or more low side drivers to the set of power supplies and the voltage from the battery to a second one or more parts of the electric vehicle when the switch module disconnects the one or more high side driver components.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of controlling output from a battery of an electric vehicle. The various concepts introduced above and discussed in greater detail below may be implemented in any of numerous ways.

The present disclosure is generally directed to improving the speed with which power delivered from a high voltage battery of an electric vehicle (EV) to components (e.g., an electric motor) of the electric vehicle is reduced or eliminated responsive to activation of an element of an EV (e.g., an airbag). Reducing the amount of time between the activation of an EV element and disconnection or reduction of the voltage or power from the EV battery can be beneficial for various parts or systems of the EV in the events in which particular EV elements, such as airbags for example, are activated. The present solution is directed to a hardware-based architecture configured to disconnect an EV battery from at least one EV component or system, and to reduce the time taken to disconnect the high voltage EV battery from, or reduce the voltage or power provided by the battery to, various components and systems of the EV, such as an electric motor of the EV powertrain.

For example, a hardware-based battery disconnect architecture of the present solution can include an electrical circuit that can utilize a switch, such as a pyrotechnic switch, that can be configured to disconnect the high voltage EV battery in response to a signal that can be generated by a restraints control module of the EV. The switch can be connected to one or more driver components, which in turn can control the contactors controlling high voltage supply from the EV battery. Using a switch to disconnect the driver components controlling the contactors, the high voltage supply from the EV battery can be disconnected, or reduced to below a threshold, in response to an airbag activation signal. The present solution allows the EV with the reduced voltage from the battery to operate a backup mode, enabling EV movement at slower speeds and power, such as for example at a maximum speed of about 30 miles per hour.

Figure 1:
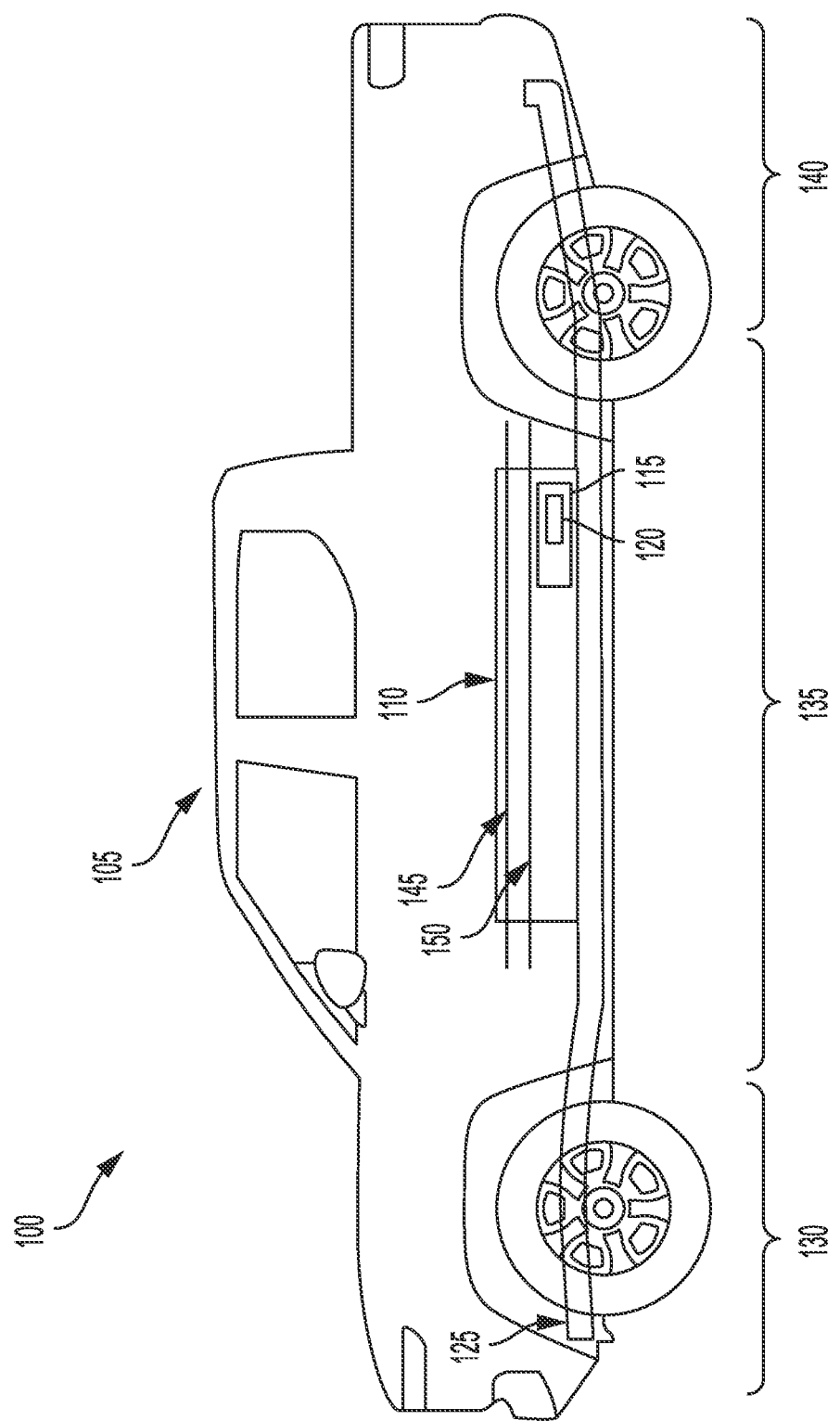
FIG. 1 depicts an example electric vehicle.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
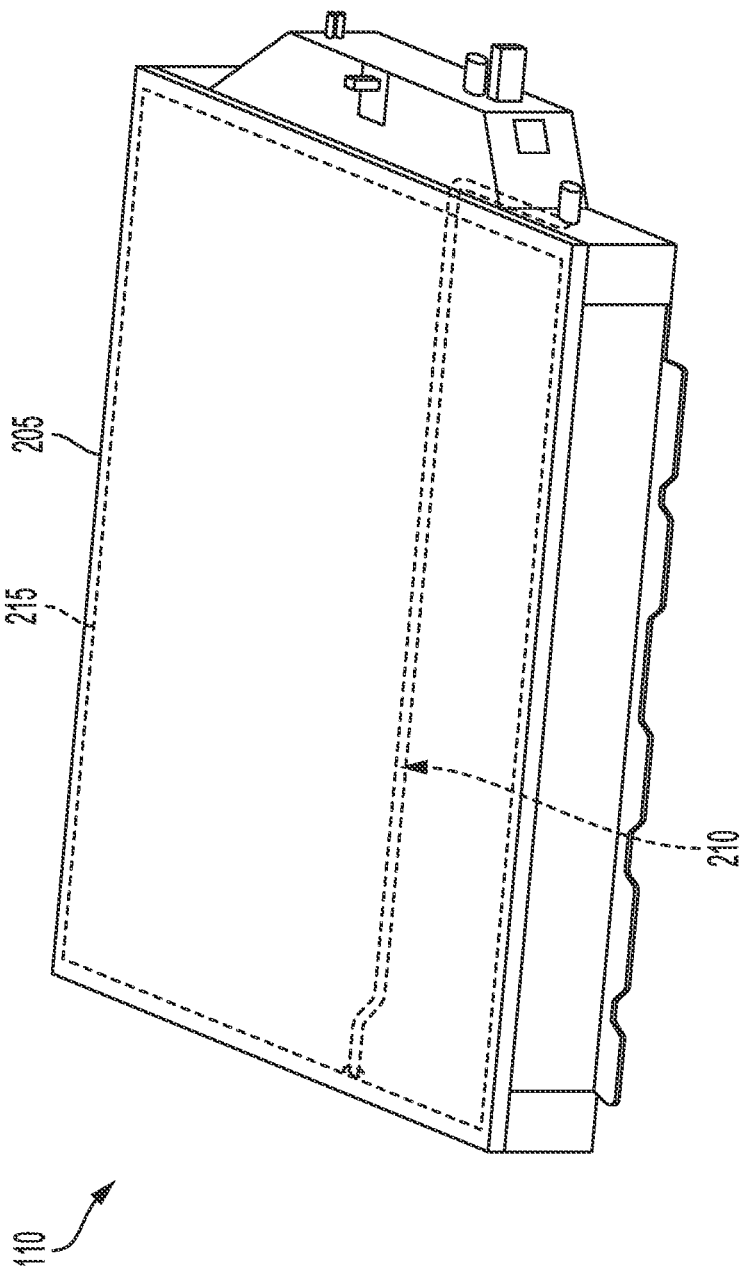
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. In some instances, the thermal component 215 may be positioned in relation to a top submodule and a bottom submodule, such as in between the top and bottom submodules, among other possibilities. The battery pack 110 can include any number of thermal components 215. For example, there can be one or more thermal components per battery pack 110, or per battery module 115. The fluid (e.g., cooling) line 210 can be coupled with, part of, or independent from the thermal component 215.

Figure 2B:
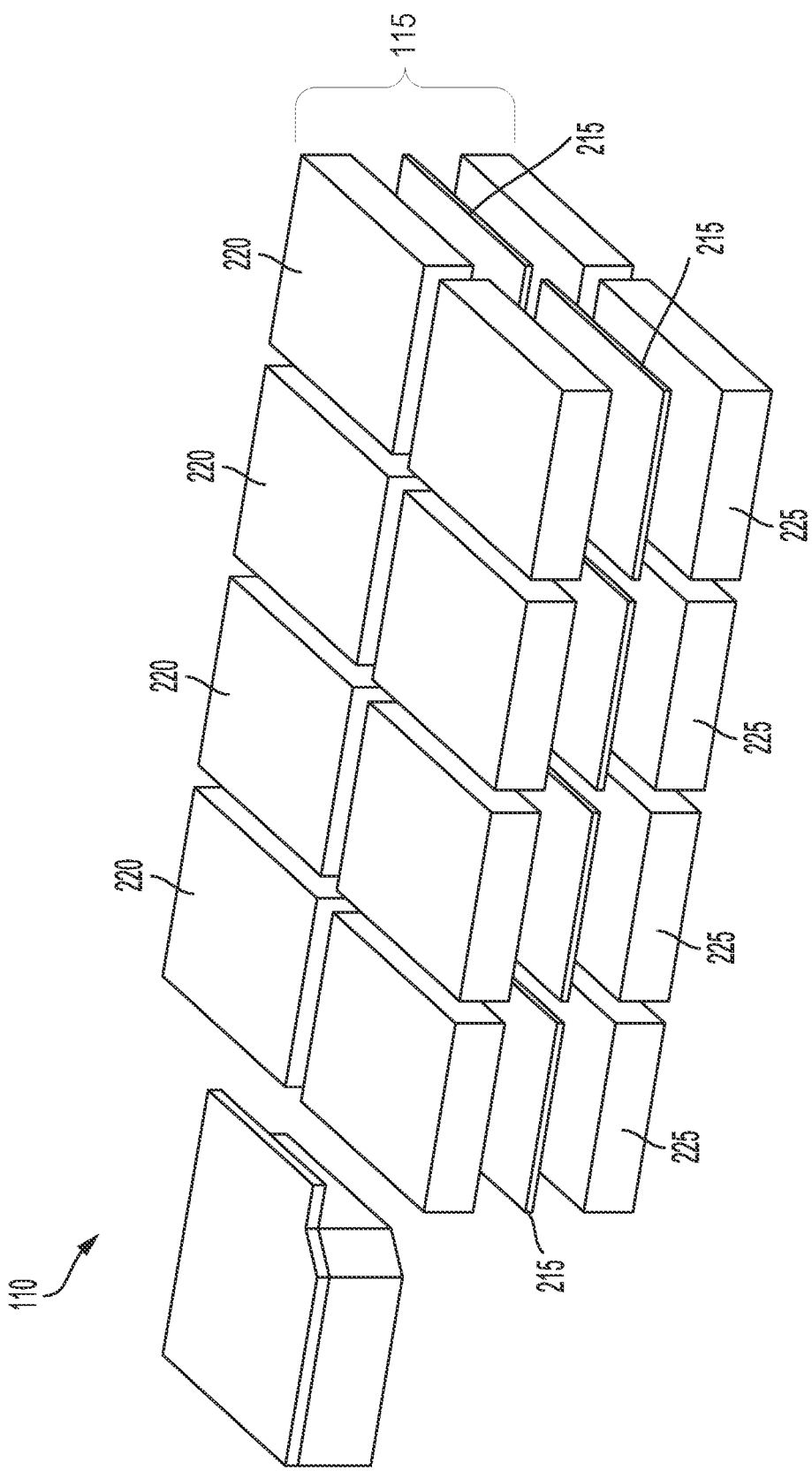
FIG. 2B depicts an example of one or more battery modules.
Figure 2C:
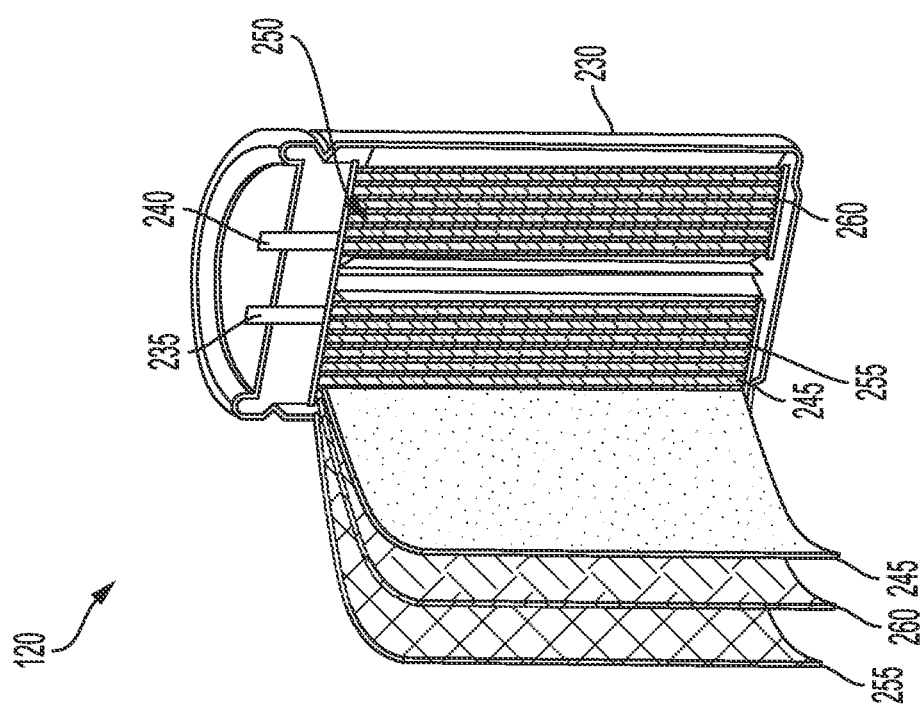
FIG. 2C depicts a cross sectional view of an example of a battery cell.

FIG. 2B depicts example battery modules 115, and FIG. 2C depicts an example cross sectional view of a battery cell 120. The battery modules 115 can include at least one submodule. For example, the battery modules 115 can include at least one top submodule 220 or at least one bottom submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical, prismatic, or pouch cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

The battery cell 120 can include a lithium-ion battery cell, for example. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated).

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120.

The electrolyte layer 260 can include or be made of a liquid electrolyte material. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 260 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

Figure 3:
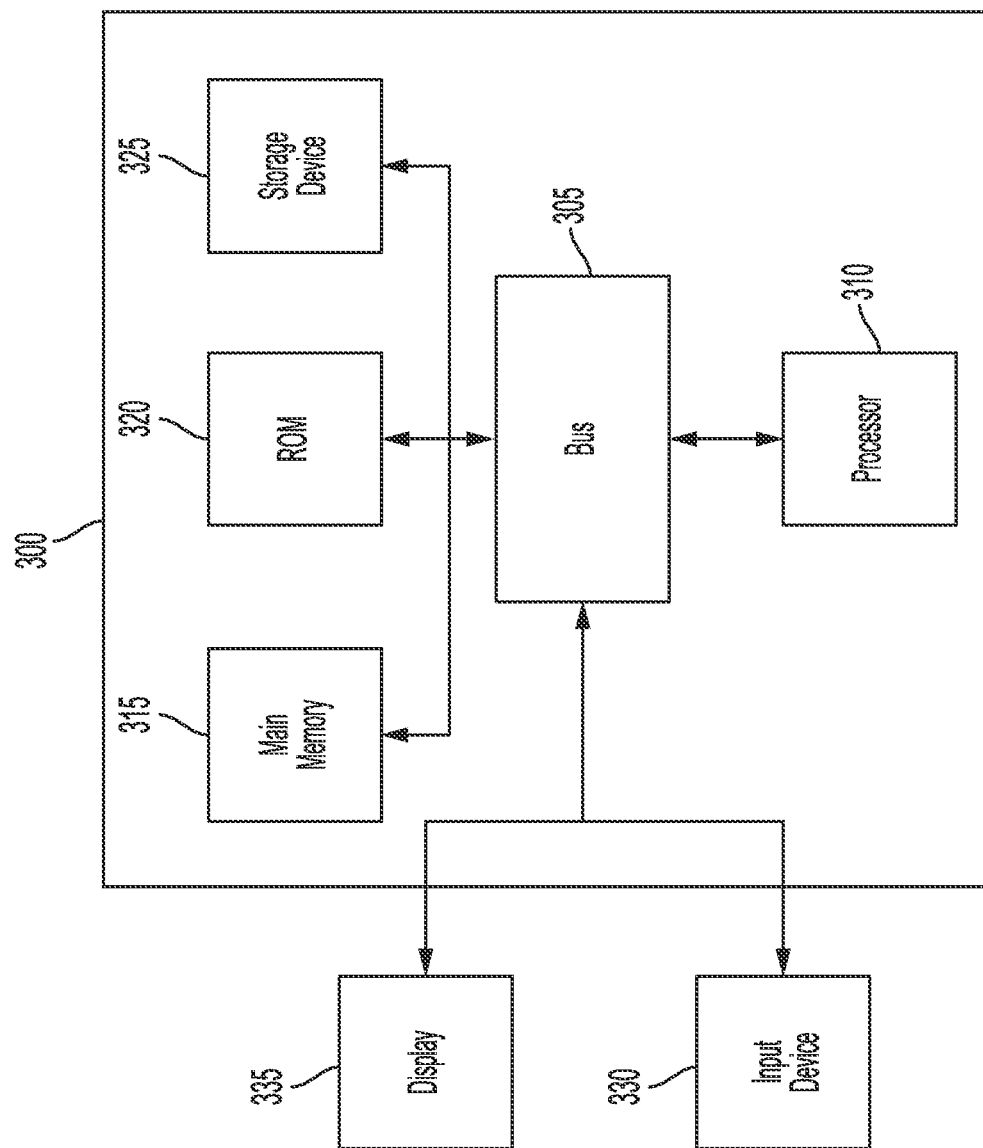
FIG. 3 is a block diagram illustrating an example architecture for a computer system that can be employed to implement elements of the systems and methods described and illustrated herein.

FIG. 3 depicts an example block diagram of an example computer system 300. The computer system or computing device 300 can include or be used to implement a data processing system or its components. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
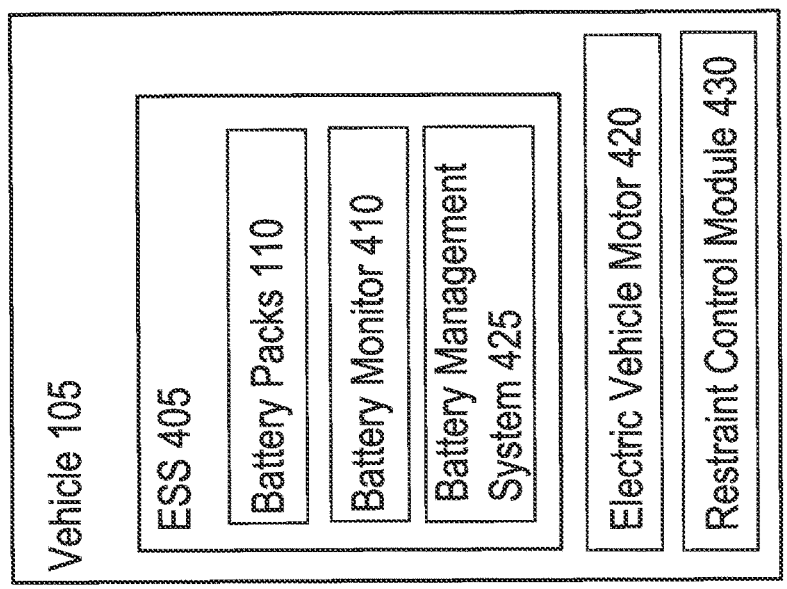
FIG. 4 is a block diagram illustrating an example of a system of an electric vehicle in which an example electrical circuit can be used to disconnect or reduce the voltage or power output from the EV battery in response to actuating an element of the EV.

FIG. 4 illustrates an example system 400 in which one or more vehicles 105 can include one or more energy storage systems (ESS) 405, one or more EV motors 420 and one or more restraints control modules (RCM) 430. Each ESS 405 can include one or more battery packs 110, one or more battery monitors 410 and one or more battery management systems (BMS) 425. Using these components, alongside components described and discussed in connection with FIG. 5, the present solution can provide an interlocking mechanism for disconnecting a high voltage EV battery (e.g., battery packs 110) from one or more EV motors 420, or any other electrical system or component of the EV. This technical solution can disconnect the high voltage EV battery, or reduce the voltage level, responsive to an event or condition such as the activation of an airbag, or any other element of the EV.

Energy Storage System 405 can include hardware, software, or any combination of hardware and software for storing and distributing energy from the EV high voltage battery (e.g., battery packs 110) to various parts of the EV 105. ESS 405 can include functionality, such as scripts, functions and computer code stored in memory or operating on one or more processors. ESS 405 functionality can control or manage energy stored in battery packs 110 as well as distribution of the stored energy from the battery (e.g., battery packs 110) to other parts of the EV 105. ESS 405 can include primary and/or secondary batteries, as well as their respective controllers or management functionalities, including for example, a BMS 425. ESS 405 can include circuits or functions for monitoring voltage or power of the EV 105.

ESS 405 can include one or more battery monitors 410 for monitoring or measuring input into, or output from, the EV battery. A battery monitor 410 can include any combination of hardware and software, including any functionality, such as scripts or computer code stored in memory or operating on processors. A battery monitor 410 can include functionality to monitor voltage, current or power to and from the EV battery, including one or more battery packs 110 or any of its internal components (e.g. battery modules 115 or battery cells 120). Battery monitor 410 can measure voltage or power output from the EV battery (e.g., battery packs 110). Battery monitor 410 can work together with various circuits or systems controlling the power output from the ESS 405 to manage power output from the EV battery (e.g., battery packs 110).

Battery management system (BMS) 425 can include any combination of hardware, firmware and/or software for managing stored power on the EV high voltage battery (e.g., battery packs 110 and its interior components) and to deliver the stored power to the systems and components of the EV. BMS 425 can include functionality, such as scripts, functions and computer code stored in memory or operating on a processor. BMS 425 can include functionality for protecting the EV high voltage battery and facilitating the battery's operation within predetermined limits of operation. BMS can include functionality for monitoring and controlling power storage systems including any state of charge (SOC) and state of health (SOH) functions or components. BMS 425 can include firmware functions that can be implemented at a firmware level to facilitate a high fidelity of communication with onboard vehicle telemetry. BMS 425 can include functionality for regulating power from external charger to the battery packs 110 during a charging event. BMS 425 can enable or disable one or more systems or circuitry to maintain stasis at vehicle level. During a driving event, BMS 425 can communicate with and direct power from battery packs 110 to various EV components, such as motor 420, or other components, such as for example powertrain or drive inverter.

EV motor 420 can include any motor for providing movement to the wheels of an EV 105. EV motor 420 can include a stator and a rotor providing torque to the vehicle, such as via a crankshaft, transmission and to a differential. EV motor 420 can be powered by the high voltage battery (e.g., battery packs 110) of the ESS 405. EV motor 420 can receive the power from the battery packs 110 to provide kinetic energy to the vehicle. EV motor 420 can provide varying amounts of power to the vehicle, based on the amount of energy it receives from the battery packs 110.

Other than EV motor 420, the EV 105 can include any number of other parts whose supply from the EV battery (e.g., 110) can be controlled by the systems and circuits of the present disclosure. For example, the systems and circuits described herein can control the power or voltage output from the EV battery (e.g., 110) to any part of the powertrain of the EV, a power inverter, a battery charger, a charging port, a thermal system, an air conditioning system, a power steering, lighting devices, an entertainment system or any other part of the EV 105 that is powered from the EV battery (e.g., 110). Therefore, just like in response to reducing or eliminating power or voltage to the motor 420, the systems or circuits of the present solution can eliminate or reduce the power or voltage to any of those systems or parts, as well.

Restraint control module (RCM) 430 can include hardware, software, or any combination of hardware and software for controlling or monitoring activation or actuation of one or more elements of an EV 105. RCM 430 can control and manage activation or actuation of one or more airbags, one or more pre-tensioners for seatbelts, one or more automatic messages or communications to be sent, one or more phone calls, or similar. Restraint control module 430 can be powered by the EV battery (e.g., battery packs 110) and can use pressure and acceleration sensors to detect instances in which airbags can be actuated. Restraint control module 430 can include functionality, such as scripts, functions and computer code stored in memory or operating on a processor. RCM 430 can include hardware components implementing functionalities of the RCM 430 in hardware. For example, RCM 430 can include an object floating in a material or a magnetic field, triggering a signal in response to a sufficiently strong impact. RCM 430 can include an airbag control unit that can include the functionality for actuating one or more airbags of the EV. RCM 430 can include functionality for sending a signal to actuate one or more airbags. RCM 430 can share or forward the signal to actuate an airbag using a switch or a switching circuit, such as those discussed in connection with electrical circuit 500 in FIG. 5.

Figure 5:
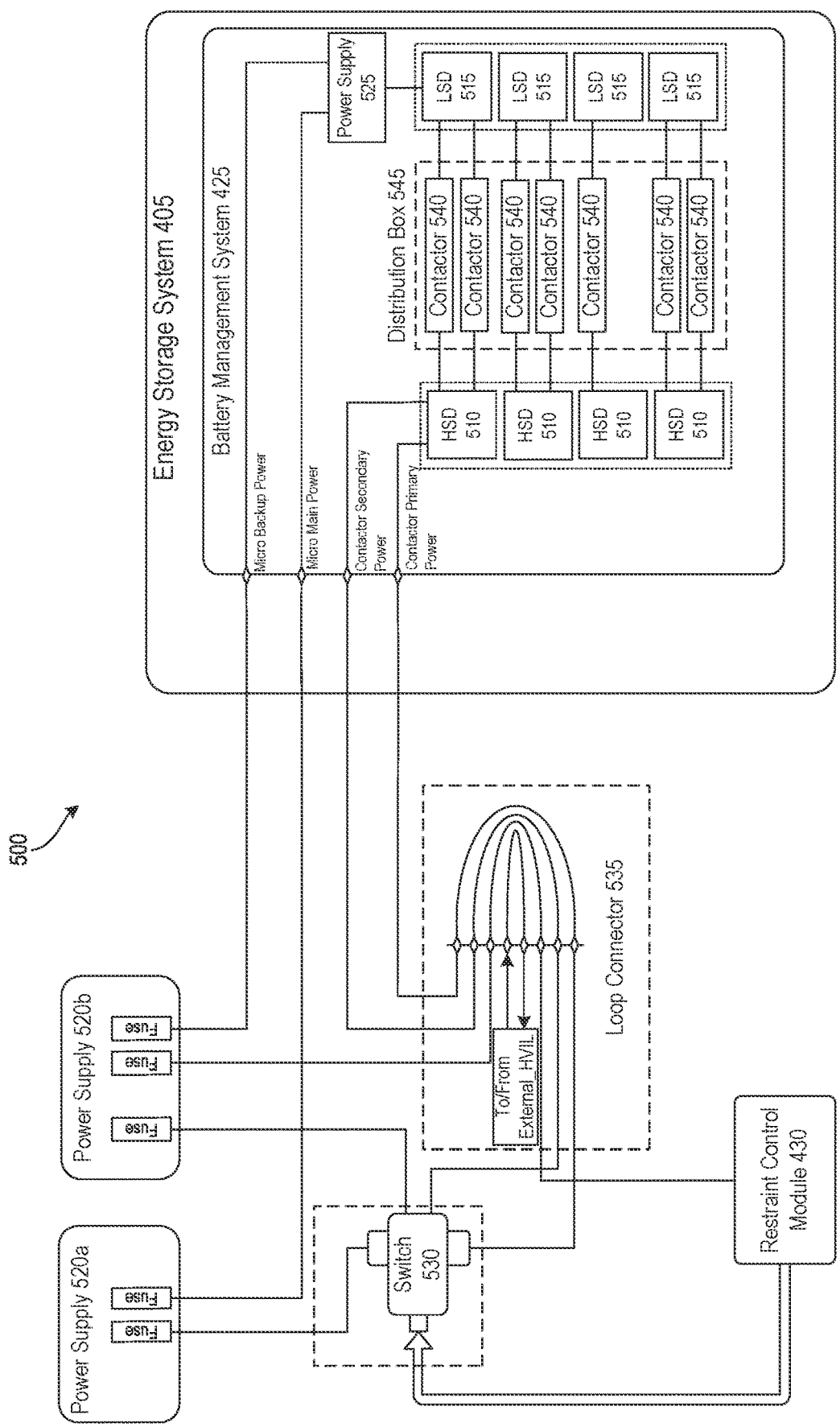
FIG. 5 is a block diagram illustrating an example of a system or an electrical circuit for disconnecting or reducing the voltage or power from the EV battery to components of the EV.

FIG. 5 presents an example electrical circuit 500 that can provide an interlock for disconnecting or reducing the voltage from the EV battery (e.g., battery packs 110) to one or more components of the EV 105, such as an electric motor, in response to an element, such as an airbag, being activated. The electrical circuit 500 can include one or more contactors 540 components that can be located in a distribution box 545 of a BMS 425, which can be a part of the ESS 405. A distribution box 545 can include one or more driver components, such as high side drivers (HSD) 510 that can connect to one side of the contactors 540 on one side and one or more low side drivers (LSD) 515 that can connect to the other side of the contactors 540. The one or more LSDs 515 can be connected to and powered by a power supply (PS) 525, which can in turn be powered using a plurality of power supplies 520. The plurality of power supplies 520 can include a primary PS 520a and a secondary PS 520b. The plurality of power supplies 520 can provide the power to the one or more HSDs 510 via a loop connector 535 and through a switch 530. The switch 530 can be connected to a RCM 430 and can receive a signal from the RCM 430 to activate or actuate an element or emergency safety feature of an electric vehicle, such as an airbag for example. Upon receiving the signal, the switch 530 can sever the contacts connecting the loop of the power supplies 520 to the HSDs 510. Disconnecting the HSDs 510 from the power supplies 520 can cause the voltage or power from the battery (e.g., battery packs 110) to be reduced. For example, contactors 540 can be controlled by HSDs 510 to reduce or disconnect the voltage from the EV battery (e.g., battery packs 110) to the motor 420 of the EV powertrain, responsive to the switch 530 disconnecting the HSDs 510 from the power supplies 520 in response to the signal from the RCM 430.

BMS 425 can include one or more distribution boxes 545. A distribution box 545 can include an enclosure, a box, or a location in which one or more electrical or electronic components for controlling power or voltage delivery to and from the EV high voltage battery (e.g. battery packs 110) can be deployed. Distribution box 545 can provide protection or isolation to the electrical or electronic components located within. Distribution box 545 can include any number of wiring lines, connectors, contactors 540 or relays, driver components, such as HSD 510 or LSD 515, transistors, switches, circuit breakers, processors and any other combination of electrical, electronic, mechanical or other components.

Driver components, which can also be referred to as drivers, such as for example HSDs 510 or LSDs 515, can include any one or more digital logic power transistors for controlling one or more loads. A load controlled by a driver component can include a circuit, a device or any system of an EV 105. For example, a driver component (e.g., HSD 510 or a LSD 515) can be connected to any motor 420, a lighting device in a vehicle, a power inverter, a powertrain, a charger, a vehicle wiper, a fan, an entertainment system, or any other component of an EV 105. A driver component can control turning the load on or off, in response to an input signal. The input signal can be an input signal to a gate of a power transistor. The input signal can be a low power signal in comparison to the power levels of the output provided by or through the driver (e.g., driver's transistor drain). Driver components can utilize one or more discrete power transistors, including for example bipolar junction transistors (BJTs) or metal-oxide-semiconductor field-effect transistor (MOSFETs), as well as any other electrical, electronic, electromechanical or other components used in the field.

High side drivers 510 can include power transistor parts, systems or configurations in which a load being controlled by the driver component can be connected between the driver component and the ground of the electrical circuit. For example, a high side driver 510 can include a driver component being connected to a power supply line on one end and a load on the other, while the load can be connected between the driver component and the ground. In a vehicle 105, a high side driver 510 can be used, for example, to power loads, such as seats, lighting fixtures or lighting devices, windshield wipers and fans.

Low side drivers 515 can include power transistor configurations in which a load that is controlled by the driver component is connected between the power supply line and the driver component, while the driver component is connected between the load and the ground. Low side drivers 515 can be used, for example, to power motors, solenoids and heaters of the EV 105.

Contactors 540 can include electrical devices that can be used for switching on or off electrical circuits operating in a high current regime, such as for example an electric motor of a powertrain of an electric vehicle. Contactors 540 can include the functionality of a relay and can include a coil or an electromagnet. Contactors 540 can include an enclosure and one or more contacts for connecting to other components, such as driver components. Contactors 540 can be used, for example, to open a circuit under a potential short circuit load, thus preserving any exposed electronics from any potential high current short circuits. Contactors 540 can be deployed in the circuit controlling the voltage or power provided from the EV battery (e.g., battery packs 110) to the motor 420.

A switch or switch module 530 can include any switching circuit or a mechanism for providing connection between two or more elements or components and then disconnecting such connected elements or components in response to an input signal. Switch 530 can include an electrical or electronic interrupter circuit. Switch module 530 can include programming logic, circuitry. Switch 530 can include a fuse. Switch 530 can include a pyrotechnical switch, or a pyro-switch, that can include a pyrotechnic fuse component. The fuse component of the switch 530 can disconnect a circuit, such as connections that are connected via the switch. The fuse can disconnect the circuit without, or with a reduced, dependence on the magnitude of an over-current. The pyrotechnic fuse component can include a high voltage positive battery terminal fuse that can disconnect a circuit before a short circuit can take place. Switch 530 can include programming logic or circuitry to detect an input signal. Switch 530 can include programming logic or circuitry to electrically disconnect the connected elements in response to the input signal. Switch 530 can include contacts for one or more lines being connected or disconnected. For example, switch 530 can include two pairs of contacts for two separate lines of an electrical circuit, such as for example the primary PS 520a and a secondary PS 520b. The switch 530 can provide continuity between one or more pairs of contacts. The switch 530 can provide a connection, as well as a disconnect, between two pairs of contacts (e.g., two lines of PS s 520 and two destination circuit elements). The switch 530 can provide a connection between the connected contacts prior to the switch 530 receiving the signal to disconnect the contacts, and in response to the signal, terminate the connection between both pairs of contacts at once.

The switch 530 can disconnect its contacts (e.g., lines connected via the switch) in response to any signal. The signal can include, for example, a signal from an RCM 430. The signal can include the signal that the RCM 430 has actuated or activated an element of an EV 105. The signal can include the signal that the RCM 430 is actuating or activating or a command to actuate or activate the element of an EV. The element activated or actuated can include an airbag, a pre-tensioner, a communication or a phone call, or any other feature which an RCM 430 can control, manage or activate.

Loop connector 535 can include a connector comprising one or more wire lines carrying power or signals between electrical components of an electrical circuit and formed in a detachable loop or a half-loop. Loop connector 535 can provide a loop of multiple wire lines through which signals between electrical components of the electrical circuit 500 are routed, such that when the loop connector 535 is disconnected from the electrical circuit 500, the one or more of components of the electrical circuit 500 are powered down. Loop connector 535 can include a connector that can be manually disconnected from or connected to the electrical circuit 500. Loop connector 535 can include an electronic switch or a disconnect.

A loop connector 535 can include one or more lines for an external high voltage interlock loop (HVIL), which can include a low voltage circuit that determines if high voltage connectors are fully seated. Upon disconnection of the loop connector 535, HVIL can be disconnected, thus not completing its electrical loop. A loop connector 535 can include the lines connecting the power supplies 520 to HSDs 510, where upon disconnecting the loop connector 535 from the electrical circuit 500, HSDs 510 can be disconnected from the power supplies 520, thus not providing power to the loads connected to, or controlled by, the HSDs 510.

Power supplies 520 can include any plurality of direct current (DC) power supply for powering electronic components, such as driver components HSD 510 and LSD 515. Power supplies 520 can also include AC power supplies or any other power supplies known or used in EVs 105. Power supplies 520 can include a primary power supply 520a and a secondary power supply 520b. The primary and secondary power supplies 520a and 520b can provide the same and redundant outputs to various components of the electrical circuit 500 in order to reduce the chance of an event in which no power is provided to the serviced components. Power supplies 520 can include fuses which can be used for contacts with various components of the electrical circuit 500. Power supplies 520 can provide any voltage direct current (VDC), such as 9V, 12V, 18V, 24V or any other voltage level.

Power supply 525, also referred to as a PS 525, can include any power supply that is powered by another power supply, such as one or more of the plurality of power supplies 520. Power supply 525 can be a DC or an AC power supply. PS 525 can include a different voltage output than the output of the power supplies 520. For example, PS 525 can receive a 12 VDC from the power supplies 520, and using the received power, output a 9 VDC output or a 24 VDC to one or more LSD 515. PS 525 can serve as a power supply for the LSDs 515 of the electrical circuit 500. For example, PS 525 can be configured to be powered by power supplies 520 and provide a specific VDC output to the LSDs 515, which can be same or different than the VDC output from the power supplies 520.

Power supplies, including power supplies 520 or PS 525, can include multiple lines through which power can be provided to components of the electrical circuit 500. As shown in FIG. 5, a plurality of power supplies 520 can include a first of the two power supplies 520 (e.g., 520a) including two lines that connect to, or provide power for, different parts of the electrical circuit 500. The two lines can each be connected via two fuses of the PS 520a. A first of the two lines can go, via a first fuse, into one a first of the two contacts of a first connection of the switch 530, while the second contact of the same first connection leads to a line that continues through the loop connector 535 and into the contactor primary power signal of one or more HSDs 510 in the distribution box 545. A second of the two lines of the first PS 520 can be routed from the PS 520a, via a second fuse, and via a micro main power contact into the BMS 425 of the ESS 405 to provide power to a PS 525.

The second PS 520 of the plurality power supplies 520 (e.g., PS 520b) can provide three lines of output via three of its fuses. The first line can run to a first of the two contacts of a second connection of the switch 530, whereas the second contact from the second connection can lead to a line that runs through the loop connector 535 and into a contactor secondary power contact of the one or more HSDs 510. A second line the second PS 520b can loop through the loop connector 535 and into a RCM 430. A third line of the second PS 520b can loop into the BMS 425 of the ESS 405 and into the micro backup power contact of the PS 525.

The switch 530 can include two connections, each one of which can include its own pair of contacts for connecting (or selectively disconnecting) different components of the electrical circuit 500. The first of the two connections can connect a first of the two power supplies 520 and one or more HSDs 510 in the BMS 425. For example, a first contact of the first connection of the switch 530 can connect to the PS 520 and the second contact of the same first connection can lead to a line that can be routed, via a loop connector 535, to one or more HSDs 510 in the BMS 425. The second of the two connections can be between a second of the two power supplies 520 and the one or more HSDs 510. For example, a first contact of the second connection of the switch 530 can be connected to the second of the two PS 520, while the second contact of the second connection can run, via a loop connector 535, to one or more HSDs 510 in the BMS 425. In this configuration, a loop connector 535 can provide a manual disconnect between the HSDs 510 and their power supply PS 520. Similarly, a switch 530 can provide an electrical or electronic disconnect between the HSDs 510 and the power supplies 520.

The example block diagram depicted in FIG. 5 can be modified based on the design. For example, HSDs 510 and LSDs 515 can be reversed from the illustrated example, and each can be connected via switch 530 and powered via PS 525 or other power supplies. Switch 530 can be connected so as to disconnect HSDs 510, LSDs 515 or PS 525 or any other suitable component of the circuit 500 from its power sources. Variations of the illustrated examples can include different connections from those shown in FIG. 5.

The present solution can provide an interlock mechanism, via a hardware-based electrical circuit (e.g., 500), to disconnect high voltage battery of the EV (e.g., 110) from one or more parts of the EV 105 (e.g., a motor 420) in response to a signal from an RCM 430. The electrical circuit (e.g., 500) can include a plurality of power supplies (e.g., 520) and one or more components (e.g., 510, 515), that can be energized by the plurality of power supplies. The electrical circuit can provide a voltage greater than a threshold from a battery (e.g., 110) of the electric vehicle (e.g., 105) to a motor (420) of the electric vehicle. The electrical circuit can include a switch (e.g., 530) that connects the driver component (e.g., 510, 515) with the plurality of power supplies (e.g., power supplies 520). The switch can be configured to detect that the electric vehicle (e.g., 105) generated a signal to actuate an element of the electric vehicle (e.g., an airbag) and disconnect, in response to the detection, the driver component (e.g., 510) from the plurality of power supplies (e.g., 520) to reduce the voltage provided to the electric motor (e.g., 420) below the threshold.

The system can include a contactor (e.g., 540) of the electric circuit (e.g., 500) connected to the driver component (e.g., 510) to disconnect the motor (e.g., 420) of the electric vehicle (e.g., 105) from the battery (e.g., 110) in response to the disconnect of the driver component (e.g., 510) from the plurality of power supplies (e.g., 520). The system can include the electrical circuit (e.g., 500) that, in response to the signal to actuate the element, which can correspond to an airbag of the electric vehicle, can reduce the voltage provided to the electric motor (e.g., 420) to less than or equal to 60 volts and operate in a backup mode. The system can include a restraint control module (e.g., 430) of the electric vehicle (e.g., 105) that provides the signal to the switch (e.g., 530). The restraint control module (e.g., 430) can be configured to be energized by the plurality of power supplies via an electrical path that does not include the switch. For example, the restraint control module (e.g., 430) can be powered from one of the PS 520 (e.g., 520b) via a line that runs from the PS 520 (e.g., 520b), through a loop connector 535, and into the RCM 430.

The system can include a second driver component (e.g., 515) connected to a contactor (e.g., 540) connected to the driver component (e.g., 510). The second driver component (e.g., 515) can be configured to be energized by a power supply that is different from and energized by the plurality of power supplies, wherein the electrical circuit is configured to continue to energize the power supply that energizes the second driver from the plurality of power supplies when the switch is disconnected. The system can include a distribution box (e.g., 545) of a battery management system (e.g., 425) that includes: a contactor (e.g., 540) connected to the driver component (e.g., 510), a low side driver component connected to the contactor and a power supply (e.g., 525) for the low side driver component energized using the plurality of power supplies (e.g., power supplies 520).

The system can include the driver component (e.g., 510, 515) that includes a transistor and the plurality of power supplies that include a primary direct voltage power supply (e.g., 520*a*) and a secondary direct voltage power supply (e.g., 520*b*). The system can include the signal that is received from a restraint control module (e.g., 430) of the electric vehicle, and the switch (e.g., 530) that can include a fuse configured to irreversibly disconnect the driver component from the plurality of power supplies. The switch (e.g., 530) can include a pyrotechnic switch.

The system can include a loop connector (e.g., 535) that can include a connection between the switch (e.g., 530) and the driver component (e.g., 510) and between at least one of the plurality of power supplies (e.g., 520*b*) and a restraint control module (e.g., 430) that provides the signal to the switch. The system can include the plurality of power supplies (e.g., 520) that can include a primary direct voltage power supply (e.g., 520*a*) that can comprise a first fuse in electrical contact with the switch (e.g., 530) and a second fuse in electrical contact with a power supply (e.g., 525) of a second driver component (e.g., 515) in contact with a contactor (e.g., 540) connected to the driver component (e.g., 510). The plurality of power supplies can include a secondary direct voltage power supply (e.g., 520*b*) of the plurality of power supplies comprising a third fuse in electrical contact with the switch (e.g., 530) and a fourth fuse in electrical contact with the power supply (e.g., 525) for the second driver component (e.g., 515).

For example, the present disclosure can be directed to an electric vehicle (e.g., 105) having an electrical circuit that can include a contactor (e.g., 540) to control power output from a battery (e.g., 110) of the electric vehicle to a motor (e.g., 420) of the electric vehicle. The electrical circuit of the electric vehicle (e.g., 105) can include a driver component (e.g., 510) to control the contactor (e.g., 540) and a set of power supplies (e.g., 520) to energize the driver component (e.g., 510) to cause the contactor to provide a voltage greater than a threshold from the battery (e.g., 110) to the motor (e.g., 420). The electrical circuit can include a switch (e.g., 530) that, in response to a signal corresponding to deployment of an airbag of the electric vehicle, disconnects the driver component (e.g., 510) from the set of power supplies (e.g., 520) to cause the contactor (e.g., 540) to reduce the voltage from the battery (e.g., 110) to the motor (e.g., 420) to less than the threshold.

The electric vehicle can include the set of power supplies (e.g., 520) that comprises a primary power supply (e.g., 520*a*) and a secondary power supply (e.g., 520*b*). The primary power supply (e.g., 520*a*) can include the electrical circuit configured to provide the power to the driver component (e.g., 510) from the primary power supply (e.g., 520) and the secondary power supply (e.g., 520*b*) via the switch (e.g., 530), and a component of the switch configured to irreversibly disconnect the primary power supply and the secondary power supply in response to the signal.

For example, the present solution can be directed to an electric vehicle (e.g., 105). The electric vehicle can include an electrical circuit (e.g., 500) of an electric vehicle having one or more high side driver components (e.g., 510) connected to one or more contactors (e.g., 540) and one or more low side driver components (e.g., 515) connected to the one or more contactors. The electrical circuit can include a set of power supplies (e.g., 520) to energize the one or more high side driver components (e.g., 510) and the one or more low side driver components (e.g., 515), via a power supply (e.g., 525) for the low side driver components, to cause one or more contactors to provide power to a plurality of parts of the electric vehicle (e.g., a motor 420, or any electrical loads in the vehicle 105). The electrical circuit can include a switch (e.g., 530) that can be configured (e.g., wired) to, in response to a signal corresponding to deployment of an airbag of the electric vehicle, disconnect the one or more high side driver components (e.g., 510) from the set of power supplies (e.g., 520) to cause the one or more contactors (e.g., 540) to reduce the voltage from the battery (e.g., 110) to a first subset of the plurality of parts of the electric vehicle. The electrical circuit (e.g., 500) can be configured (e.g., wired) to maintain connection of the one or more low side drivers (e.g., 515) to the set of power supplies (e.g., 520) and the voltage from the battery (e.g., 110) to a second one or more parts of the electric vehicle when the switch (e.g., 530) disconnects the one or more high side driver components (e.g., 510).

Figure 6:
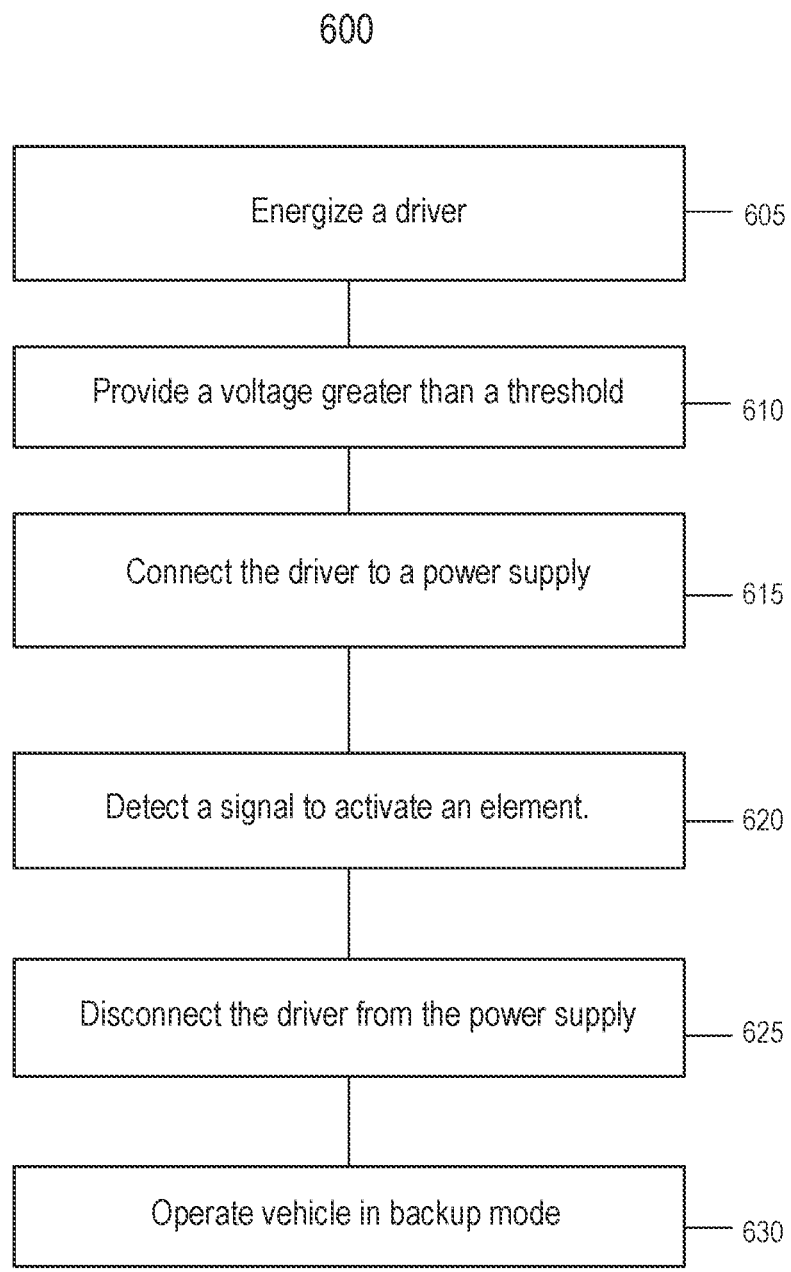
FIG. 6 is a flow diagram illustrating an example method for disconnecting or reducing the voltage or power from the EV battery in accordance with the system features of the present disclosure.

FIG. 6 illustrates a method 600 for utilizing the system and the circuit illustrated in FIGS. 4-5 to implement the control of the voltage or power output from the EV battery (e.g., 110) to the motor (e.g., 420) of the electric vehicle (e.g., 105), in response to actuation of an element of the electric vehicle. Method 600 can include ACTS 605 through 630. At ACT 605, the method can include energizing a driver. At ACT 610, the method can include providing a voltage greater than a threshold. At ACT 615, the method can include connecting the driver to a power supply. At ACT 620, the method can include detecting a signal to activate an element. At ACT 625, the method can include disconnecting the driver from the power supply. At ACT 630, the method can include operating the vehicle in backup mode.

At ACT 605 the method 600 energizes a driver. The method can energize, by a plurality of power supplies, a driver component of an electric circuit of an electric vehicle. The driver component can include a high side driver component. The driver component can include a low side driver component. A plurality of power supplies can energize, via an electrical path that does not include or route through the switch, a restraint control module of the electric vehicle which can provide the signal to the switch. The plurality of power supplies can energize a power supply for a second driver component connected to a contactor that is connected to the driver component.

The power supply for the second driver can be different from the plurality of power supplies. The plurality of power supplies can include a primary and a secondary power supply. A primary power supply can include a primary direct voltage power supply comprising a first fuse in electrical contact with the switch and a second fuse in electrical contact with a power supply for a second driver component in contact with a contactor connecting to the driver component. The secondary power supply can include a secondary direct voltage power supply comprising a third fuse in electrical contact with the switch and a fourth fuse in electrical contact with the power supply for the second driver component. The driver component can be energized via a loop connector. For example, a loop connector can connect the switch to the driver component. The loop connector can connect the plurality of power supplies to a restraint control module of the electric vehicle.

ACT 610 provides a voltage greater than a threshold. The battery of the EV can provide the voltage greater than a threshold to a motor of the electric vehicle. The battery of the EV can provide the voltage greater than a threshold to any part of the electric vehicle, such as an electric motor, a powertrain, a power inverter, one or more control modules, air conditioner or an entertainment center. The driver component can provide, or control providing, the voltage greater than a threshold from a battery of the electric vehicle to a motor, or any other part, of the electric vehicle. The driver can control a contactor that can provide the voltage from the battery to the motor, or any other part of the electric vehicle. The voltage greater than a threshold can include the voltage greater than 60V.

ACT 615 connects the driver to a power supply. The driver component can be connected, via a switch, to a plurality of power supplies providing the driver with power. The driver can be powered from the power supplies, through the switch. The switch can include a pyrotechnical switch. The switch can include a pair of contacts via which the driver component can receive the power from the power supplies. The switch can include a loop connector via which the driver component can receive the power from the power supplies. The switch can operate in a mode in which the fuse of the switch, such as the pyrotechnical fuse, is not burned or activated. The electrical circuit can connect the driver component to the power supplies via both the switch and the loop contactor.

ACT 620 detects a signal to activate an element. Act 620 detects a signal to activate or actuate an airbag of an electric vehicle. The signal can be a signal to activate a call or a communication. The switch can detect the signal to actuate any element controlled by a restraint control module of the electric vehicle. The signal can be received via a line from the restraint control module to the input port or input contact of the switch. The switch can be configured to include a fuse configured to irreversibly disconnect the driver component from the plurality of power supplies when the signal from a restraint control module is received.

ACT 625 disconnects the driver from the power supply. Disconnected driver component can include a high side driver components. Disconnected driver component can include a low side driver component. In response to the detecting of the signal at ACT 620, the electrical circuit can disconnect the driver component from the plurality of power supplies to reduce the voltage provided to the electric motor to below the threshold. In response to receiving the signal at ACT 620, the switch can burn a fuse of the switch, disconnecting the power supplies from the driver component. In response to disconnecting the driver from the driver component, the driver component can be de-energized, causing the voltage from the battery of the EV to be reduced to below the threshold.

A contactor of the electric circuit connected to the driver component can disconnect the motor of the electric vehicle from the battery in response to the switch disconnecting the driver component from the plurality of power supplies. The contactor can be de-energized in response to the driver component being disconnected from the power supply, responsive to the switch receiving the signal at ACT 620. The electric vehicle can reduce the voltage provided to the electric motor to a threshold that can be less than or equal to 60 volts. The plurality of power supplies can continue to energize the power supply for the second driver component when the switch is disconnected, or when the switch disconnects the driver component from the power supplies. A plurality of high side driver components can be de-energized and a plurality of low side driver components can remain energized.

ACT 630 operates vehicle in backup mode. The electric vehicle can operate in a backup mode in response to the signal to actuate the element corresponding to an airbag of the electric vehicle. For example, upon reducing the voltage from the battery of the EV to 60 volts or less, the backup mode of the EV can be activated. In response to de-energizing high side driver components and continuing to energize low side driver components, the EV can continue to operate some of the systems and components controlled by the low side driver components, while other systems of the vehicle controlled by the high side driver components can remain turned off.

Figure 7:
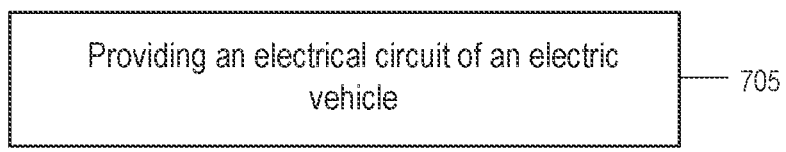
FIG. 7 is a flow diagram illustrating an example method for providing an electrical circuit of an electric vehicle.

FIG. 7 illustrates an example method 700. The method 700 can include an ACT 705 of providing an electrical circuit of an electric vehicle. The electrical circuit can include a plurality of power supplies and a driver component. The driver component can be configured to be energized by the plurality of power supplies and provide a voltage greater than a threshold from a battery of the electric vehicle to a motor of the electric vehicle. The electrical circuit can include a switch that connects the driver component with the plurality of power supplies. The switch can be configured to detect that the electric vehicle generated a signal to actuate an element of the electric vehicle. The switch can be configured to disconnect, in response to the detection, the driver component from the plurality of power supplies to reduce the voltage provided to the electric motor below the threshold.

The electrical circuit provided in ACT 705 can include one or more high side driver components connected to one or more contactors and one or more low side driver components connected to the one or more contactors. The electrical circuit can include a set of power supplies to energize the one or more high side driver components and the one or more low side driver components to cause one or more contactors to provide power to a plurality of parts of the electric vehicle. The electrical circuit can include a switch that, in response to a signal corresponding to deployment of an airbag of the electric vehicle, disconnect the one or more high side driver components from the set of power supplies to cause the one or more contactors to reduce the voltage from the battery to a first subset of the plurality of parts of the electric vehicle, and wherein the electrical circuit maintains connection of the one or more low side drivers to the set of power supplies and the voltage from the battery to a second one or more parts of the electric vehicle when the switch disconnects the one or more high side driver components.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system.

A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, a computer system 300 described in FIG. 3 can be used in conjunction with, instead of, or together with systems 400 or 500 or their system components, and vice versa. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An electrical circuit, comprising:
   a contactor of an electric vehicle connected to a first driver and a second driver;
   a set of power supplies of the electric vehicle to energize the first driver and the second driver to cause the contactor to connect a voltage from a battery of the electric vehicle to a plurality of parts of the electric vehicle; and
   a switch configured to, in response to an indication corresponding to actuation of an emergency safety feature of the electric vehicle, cause disconnection of the first driver from the set of power supplies to reduce the voltage from the battery to a first subset of the plurality of parts below a threshold voltage, while maintaining the voltage from the battery to a second subset of the plurality of parts.

2. The electrical circuit of claim 1, wherein the indication is a signal from a restraint control module to actuate an airbag of the electric vehicle and the switch includes a pyrotechnic fuse to cause the disconnection of the first driver from the set of power supplies in response to the signal.

3. The electrical circuit of claim 1, comprising:
   a distribution box comprising a plurality of contactors including the contactor, each of the plurality of contactors energized by the set of power supplies and connected to a respective first driver of a plurality of first drivers and a respective second driver of a plurality of second drivers.

4. The electrical circuit of claim 3, wherein the switch is configured to cause, in response to the indication to actuate the emergency safety feature, disconnection of the plurality of first drivers from the set of power supplies to reduce the voltage from the battery to the first subset of the plurality of parts below the threshold voltage.

5. The electrical circuit of claim 1, wherein the switch is configured to cause, in response to the indication corresponding to an airbag of the electric vehicle, reduction of the voltage provided by the battery to a motor of the electric vehicle to less than or equal to 60 volts.

6. The electrical circuit of claim 1, comprising:
   a loop connector comprising a first wire line to connect a first contact of the switch and a first contact of the first driver, a second wire line to connect a second contact of the switch and a second contact of the first driver and a third wire line to connect a power supply of the set of power supplies and a restraint control module, wherein the loop connector is configured to be manually detached to disconnect from the electrical circuit the first wire line, the second wire line and the third wire line.

7. The electrical circuit of claim 1, wherein the switch includes:
   a first connection between a first power supply of the set of power supplies and a plurality of first drivers comprising the first driver; and
   a second connection between a second power supply of the set of power supplies and the plurality of first drivers, wherein the first power supply and the second power supply provide a same voltage output to the plurality of first drivers.

8. The electrical circuit of claim 1, wherein the first driver is connected between a power supply of the set of power supplies and a load, and the load is connected between the first driver and a ground, and wherein the load corresponds to the at least one of: a seat of the electric vehicle, a lighting device of the electric vehicle, a windshield wiper of the electric vehicle or a fan of the electric vehicle.

9. The electrical circuit of claim 1, wherein the second driver is connected between a load and a ground, and wherein the load corresponds to the at least one of: a motor of the electric vehicle, a solenoid of the electric vehicle or a heater of the electric vehicle.

10. The electrical circuit of claim 1, wherein:
the first driver corresponds to a low side driver configured to control power provided to the first subset of the plurality of parts; and
the second driver corresponds to a high side driver configured to control power provided to the second subset of the plurality of parts, wherein the first subset of the plurality of parts includes a motor of the electric vehicle.

11. The electrical circuit of claim 1, comprising:
a second power supply configured to receive power from a power supply of the set of power supplies and provide power to a plurality of second drivers connected to a plurality of contactors, wherein the plurality of second drivers comprises the second driver and the plurality of contactors comprises the contactor.

12. A method, comprising:
connecting a contactor of an electric vehicle to a first driver and a second driver;
energizing, by a set of power supplies of the electric vehicle, the first driver and the second driver to cause the contactor to connect a voltage from a battery of the electric vehicle to a plurality of parts of the electric vehicle;
receiving, by a switch, an indication corresponding to actuation of an emergency safety feature of the electric vehicle; and
causing, by the switch in response to the indication, an electric circuit to disconnect the first driver from the set of power supplies to reduce the voltage from the battery to a first subset of the plurality of parts below a threshold voltage, while maintaining, by the electric circuit, the voltage from the battery to a second subset of the plurality of parts.

13. The method of claim 12, comprising:
receiving, by the switch, the indication including a signal from a restraint control module to actuate an airbag of the electric vehicle; and
causing, by a pyrotechnic fuse of the switch in response to the signal, the electric circuit to disconnect the first driver from the set of power supplies.

14. The method of claim 12, wherein:
energizing, by the set of power supplies, a plurality of contactors connected to a respective first driver of a plurality of first drivers and a respective second driver of a plurality of second drivers, the plurality of contactors provided in a distribution box comprising the contactor; and
disconnecting, by the switch in response to the indication, the plurality of first drivers from the set of power supplies to reduce the voltage from the battery to the first subset of the plurality of parts below the threshold voltage.

15. The method of claim 14, comprising:
causing, by the switch in response to the indication corresponding to an airbag of the electric vehicle, reduction of the voltage provided by the battery to a motor of the electric vehicle to less than or equal to 60 volts.

16. The method of claim 12, comprising:
connecting, by a first wire line of a loop connector, a first contact of the switch and a first contact of the first driver;
connecting, by a second wire line of the loop connector, a second contact of the switch and a second contact of the first driver; and
connecting, by a third wire line of the loop connector, a power supply of the set of power supplies and a restraint control module, wherein the loop connector is configured to be manually detached to disconnect from the battery the first wire line, the second wire line and the third wire line.

17. The method of claim 12, comprising:
connecting, via a first connection, a first power supply of the set of power supplies and a plurality of first drivers comprising the first driver;
connecting, via a second connection, a second power supply of the set of power supplies and the plurality of first drivers, wherein the first power supply and the second power supply provide a same voltage output to the plurality of first drivers.

18. The method of claim 12, wherein:
the first driver is connected between a power supply of the set of power supplies and a load, and the load is connected between the first driver and a ground, and wherein the load corresponds to the at least one of: a seat of the electric vehicle, a lighting device of the electric vehicle, a windshield wiper of the electric vehicle or a fan of the electric vehicle; and
the second driver is connected between a load and a ground, and wherein the load corresponds to the at least one of: a motor of the electric vehicle, a solenoid of the electric vehicle or a heater of the electric vehicle.

19. The method of claim 12, wherein:
the first driver corresponds to a low side driver configured to control power provided to the first subset of the plurality of parts; and
the second driver corresponds to a high side driver configured to control power provided to the second subset of the plurality of parts, wherein the first subset of the plurality of parts includes a motor of the electric vehicle.

20. An electric vehicle comprising:
a contactor of the electric vehicle connected to a first driver and a second driver;
a set of power supplies of the electric vehicle to energize the first driver and the second driver to cause the contactor to connect a voltage from a battery of the electric vehicle to a plurality of parts of the electric vehicle; and
a switch configured to, in response to an indication corresponding to actuation of an emergency safety feature of the electric vehicle, cause disconnection of the first driver from the set of power supplies to reduce the voltage from the battery to a first subset of the plurality of parts below a threshold voltage, while maintaining the voltage from the battery to a second subset of the plurality of parts.

* * * * *